United States Patent Office 2,971,027

Patented Feb. 7, 1961

2,971,027

DIAMIDES OF TEREPHTHALIC ACID

Bruce W. Hotten, Orinda, Calif., assignor to California Research Corporation, San Francisco, Calif., a corporation of Delaware No Drawing. Original application Aug. 30, 1956, Ser. No. 606,993. Divided and this application Sept. 23, 1957, Ser. No. 685,401

4 Claims. (Cl. 260—558)

This invention relates to new compositions of matter useful as thickening agents for lubricating oil compositions. More particularly, this invention is directed to diamides of terephthalic acids which are useful to thicken lubricating oils.

This application is a division of Hotten application Serial No. 606,993, filed August 30, 1956.

It is prevailing practice to use salts of certain fatty acids or other suitable acids and certain metals to produce high melting point greases. Thus, sodium and lithium stearates, also sodium and lithium salts of certain monoamides of polycarboxylic acids are employed as grease thickeners to produce high melting point greases. Metal salt thickeners are disadvantageous, however, because the metals therein promote oxidation.

Although nonmetal-containing grease thickening agents have been proposed heretofore, most of these do not produce grease compositions having high dropping points (ASTM Method D–566–42).

It is an object of the present invention to provide new compositions of matter useful in the preparation of grease compositions having high dropping points.

It is a particular object of this invention to provide nonmetallic grease thickening agents useful in the preparation of grease compositions having dropping points in the neighborhood of 400° F. or more, preferably 500° F. or more.

Another object of this invention is to provide novel compounds which can be prepared economically which are nonmetallic in nature and which are useful, among other things, as grease thickeners.

These and other objects of the invention will be apparent from the ensuing description and the appended claims.

In accordance with the present invention, I have discovered new compositions of matter of the formula:

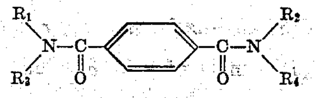

wherein $R_1$ and $R_2$ are selected from the group consisting of hydrocarbon and substituted hydrocarbon radicals attached to the nitrogen atoms by carbon-nitrogen bonds, and wherein $R_3$ and $R_4$ are selected from the group consisting of hydrogen, hydrocarbon and substituted hydrocarbon radicals, such hydrocarbon or substituted hydrocarbon radicals being attached to the nitrogen atoms by carbon-nitrogen bonds. The benzene nucleus,

in the above formula may contain alkyl radicals. In the latter case (substitution by alkyl radicals), the substituents may contain up to 8 carbon atoms, all of which may be in one substituent (e.g., a methyl, ethyl, hexyl or octyl substituent) or which may be distributed among two or more substituents (e.g., two methyl, propyl or butyl substituents, or a methyl and a butyl substituent).

As grease thickening agents, it is preferred to use the diamides of terephthalic acid having the type formula:

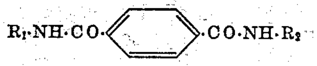

in which $R_1$ and $R_2$ each contains not less than 6 carbon atoms. If $R_1$ and $R_2$ are alkyl radicals, they preferably contain a total of at least 24 carbon atoms. If $R_1$ and $R_2$ are aromatic radicals, they preferably contain a total of at least 14 carbon atoms.

Examples of $R_1$, $R_2$, $R_3$ and $R_4$ are the normal hexyl, octyl, nonyl, decyl, undecyl, dodecyl, tetradecyl, hexadecyl, octadecyl, eicosyl, and docosyl radicals; branched chain isomers of these same radicals; phenyl, biphenyl, naphthyl (α and β), tolyl (o-, m-, and p-), nitrophenyl and nitrotolyl radicals; radicals derived from anthraquinone, such as from 2-anthraquinone; and radicals such as

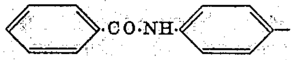

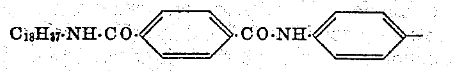

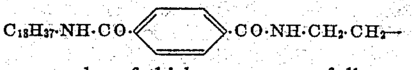

Specific examples of thickeners are as follows:

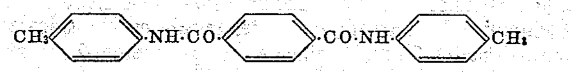

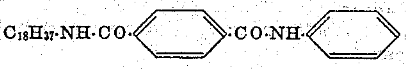

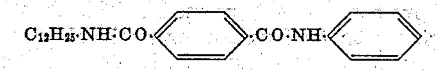

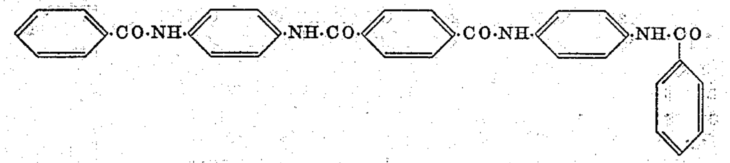

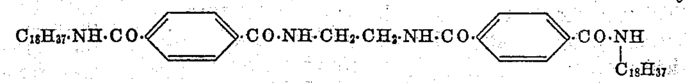

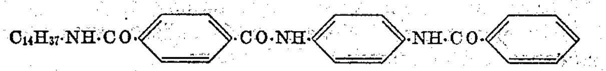

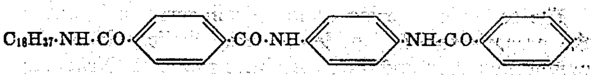

As grease thickening agents, the new composition of matter of the present invention may be employed in any type of oil of lubricating viscosity which is capable of being thickened by conventional thickeners, such as sodium and lithium stearates, to produce lubricating greases. Thus, hydrocarbon and nonhydrocarbon oils may be used. The hydrocarbon oils may be natural oils derived from petroleum, or they may be synthetic oils produced by polymerization of olefins or by synthesis from coal, carbon monoxide, etc. The nonhydrocarbon oils may be of various types, e.g., silicates, silicones, esters, etc. Specific examples of suitable base oils are as follows:

Naphthenic base, paraffinic base, and mixed base petroleum lubricating oils; other hydrocarbon lubricants, e.g., lubricating oils derived from coal products, and synthetic oils, e.g., alkylene polymers (such as polymers of propylene, butylene, etc., and mixtures thereof). Also, alkylene oxide-type polymers, dicarboxylic acid esters, liquid esters of acids of phosphorus, alkyl aromatic hydrocarbons, polymers of silicon, etc. Synthetic oils of the alkylene oxide-type polymers may be used, e.g., propylene oxide polymers produced by polymerizing propylene oxide in the presence of water or alcohols, e.g., ethyl alcohol; esters of ethylene oxide-type polymers, e.g., acetylated propylene oxide polymers prepared by acetylating propylene oxide polymers containing hydroxyl groups; polyethers prepared from alkylene glycols, e.g., ethylene glycol, etc.

The polymeric products prepared from the various alkylene oxides and alkylene glycols may be polyoxyalkylene diols or polyalkylene glyco derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, di-n-hexylfumaric polymer.

Synthetic oils of the alkyl aromatic type include those which are prepared by alkylating benzene (e.g., dodecylbenzene, tetradecylbenzene, didodecylbenzene, etc.).

Synthetic oils of the type of polymers of silicon include the liquid esters of silicon and the polysiloxanes. The liquid esters of silicon and the polysiloxanes include those exemplified by tetraethyl silicate, tetraisopropyl silicate, tetra(4-methyl-2-butyl) silicate, tetra(4-methyl-2-penta) silicate, tetra(1-methoxy-2-propyl) silicate, poly-(methylsiloxane), poly(methylphenyl) siloxane, and poly-(siloxyglycols), etc.

The above base oils may be used individually as such, or in various combinations, wherever miscible or whereever made so by the use of mutual solvents.

As grease thickening agents, the diamides of terephthalic acid of the present invention may be incorporated in suitable base oils in varying amounts. Where a high dropping point is not important, amounts as low as 5% or less may be employed, but where high dropping points (i.e., about 500° F. or higher) are desired, larger amounts of thickener should be employed, for example, 10% or higher, all such percentages being by weight, based on the finished grease. It is preferred to use no more than 30%. All percentages are by weight based on finished product.

Such greases may include other ingredients, such as oxidation and/or corrosion inhibitors, etc.

The following specific examples will serve to illustrate the preparation of diamides of terephthalic acid of the present invention and their usefulness as grease thickening agents.

PREPARATION OF TEREPHTHALDIAMIDES

*Example 1.—N-dodecyl-N'-phenylterephthaldiamide*

Terephthaloyl dichloride,

was prepared by refluxing an excess (90 ml.) of thionyl chloride ($SOCl_2$) with 83 grams of terephthalic acid in 1 liter of toluene for three hours, using 10 ml. of triethylamine as catalyst. The thionyl chloride was added dropwise and the refluxing was carried out with stirring. 600 ml. of toluene was then distilled off along with unreacted $SOCl_2$. Fresh toluene was added to bring the volume up to 1500 ml. and a mixture of 68 grams of Alamine 21 and 65 grams of aniline (0.3 and 0.7 gram mol, respectively), and 175 ml. of triethylamine were added dropwise during ten minutes. Alamine 21 is the trademark of General Mills, Inc., Minneapolis, Minnesota, for a commercial fatty amine which is predominantly n-dodecylamine. The triethylamine was added to function as a hydrogen chloride acceptor. The toluene was evaporated off on a steam plate.

The product was a mixture of N,N'-didodecylterephthaldiamide; N,N'-diphenylterephthaldiamide; and N-dodecyl-N'-phenylterephthaldiamide, predominating in the latter. It contained 7.5% nitrogen and had a melting point of 272–298° C. The principal reaction involved was as follows, yielding N-dodecyl-N'-phenylterephthaldiamide:

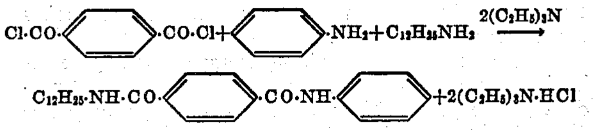

*Example 2.—N,N'-di-p-tolylterephthaldiamide*

1284 grams of p-toluidine and 582 grams of dimethyl terephthalate (12 and 3 gram mols, respectively) were heated and stirred together at 170–210° C. for 6 hours. The product was washed three times with boiling benzene and was dried. A yield of 733 grams was obtained consisting of two-thirds of the ditoluidide and one-third methyl-N-tolylterephthalamate having the following respective formulas:

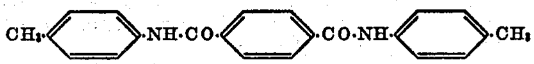

and

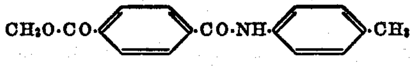

The saponification number of the product was 154 and nitrogen content was 6.54%.

*Example 3.—N,N'-di-2-anthraquinoneterephthaldiamide*

500 grams (1.04 mol) of a 20% solution of terephthaloyl dichloride in toluene was added to one liter of dioxane. This mixture was thoroughly blended together, after which there was added a solution consisting of 160 ml. (1.15 mol) of triethylamine and 150 ml. of dioxane, followed by 200 grams (0.99 mol) of 2-aminoanthraquinone. This mixture was heated at reflux temperature for 3 hours, after which it was cooled to about 105° F. and filtered. The resulting N,N'-di-2-anthraquinoneterephthaldiamide was washed with hot water until the filtrate was free from chloride ion. The product contained 4.02% by weight nitrogen.

GREASE PREPARATION

*Example 4*

A mixture of 200 grams of the product of Example 1 (a mixture of N,N'-didodecylterephthaldiamide; N,N'-diphenylterephthaldiamide, and N-dodecyl-N'-phenylterephthaldiamide predominating in the latter) and 1133 grams of a California naphthenic base oil having a viscosity of 1700 SSU at 100° F. was stirred and heated to 490° F.; milled through a Manton-Gaulin mill (4000 p.s.i.) at 425–450° F.; and pan cooled. The worked penetration ($P_{60}$) at 60 strokes (i.e., 60 strokes in the ASTM worker at 77° F., ASTM Method D217-52T) was 269. The ASTM dropping point was 502° F.

*Example 5*

A mixture of 25 grams of the product of Example 2

*Example 6*

150 grams of N,N'-di-2-anthraquinoneterephthaldiamide for Example 3 hereinabove and 350 grams of a poly(phenylmethyl siloxane) (i.e., Dow Corning DC-550) were heated to 500° F.; then cooled to 350° F.; and milled through a Manton-Gaulin mill at 4000 p.s.i. The resulting grease had an ASTM dropping point of 580+ °F.; a $P_0$ of 237; a $P_{60}$ of 360; and a high speed bearing life of 331 hours at 450° F.

Other greases containing a variety of diamides of terephthalic acid as thickeners for a variety of oils are illustrated, together with test results, in the following table:

TABLE

| Thickener | Percent Thickener | Base Oil | ASTM Dropping Point, ° F. | $P_0$ | $P_{60}$ | Bearing Stability |
|---|---|---|---|---|---|---|
| (1) N-octadecyl-N'-phenyl terephthaldiamide | 20 | (1) | 375 | 195 | 250 | ---------- |
| | 30 | (2) | 423 | ------ | 370 | ---------- |
| | 18 | (1) | 390 | 208 | 265 | ---------- |
| (2) N-dodecyl-N'-phenyl terephthaldiamide | 25 | (1) | 475 | 201 | 278 | −83 |
| (3) N-tetradecyl-N'-phenyl terephthaldiamide | 19 | (1) | 475 | 225 | 296 | ---------- |
| | 20 | (2) | 543 | 199 | 231 | ---------- |
| | 20 | (1) | 508 | 183 | 258 | ---------- |
| | 19 | (3) | 427 | 182 | 266 | ---------- |
| | 15 | (1) | 502 | 235 | 269 | ---------- |
| | 17 | (2) | 538 | 176 | 247 | ---------- |
| (4) 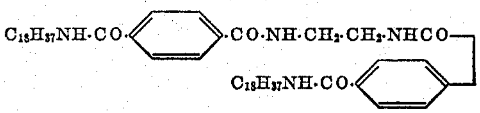 | 17 | (1) | 338 | 238 | 320 | ---------- |
| (5) 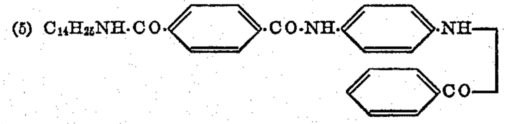 | 25 | (1) | 544 | 218 | 330 | ---------- |
| | 22.5 | (2) | 546 | 254 | 334 | ---------- |
| (6) 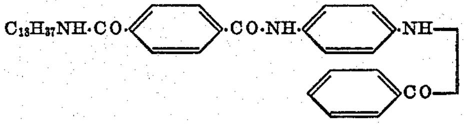 | 20 | (1) | 580+ | 191 | 278 | −25 |
| | 15 | (1) | 500+ | 205 | 276 | −20 |
| | 30 | (2) | 580+ | 139 | 222 | ---------- |
| (7) 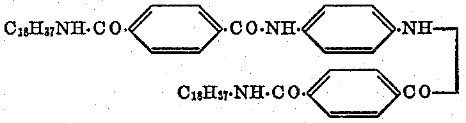 | 13 | (1) | 580+ | ------ | ------ | ---------- |
| | 15 | (1) | 276 | ------ | ------ | ---------- |
| (8) ⅓ N-methyl-N'-tolyl terephthalamate plus ⅔ N,N'-ditolyl terephthaldiamide | 25 | (2) | 500+ | ------ | ------ | ---------- |
| (9) 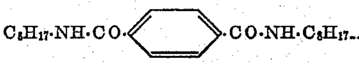 | 25 | (3) | 374 | 231 | 352 | ---------- |

(one-third methyl-N-tolylterephthalamate and two-thirds N,N'-di-p-tolylterephthaldiamide) and 75 grams of a poly-(phenylmethyl siloxane) oil (Dow Corning DC-550) was heated with stirring to 600° F.; pan cooled; then milled in a needle valve mill at 4000 p.s.i. The resulting smooth, soft brease had an ASTM dropping point of 500+° F.; worked penetration ($P_{60}$) of 348; and a high speed bearing life of 510 hours (average of two runs, 354 and 665 hours) at 450° F. and of 307 hours (average of two runs, 212 and 401 hours) at 500° F. The high speed bearing life test (quoted as Mil-G-25013) was run as follows:

A 204K Conrad type 8-ball bearing packed with grease was operated at 10,000 r.p.m. continuously for 22 hours at the designated temperature. The bearing was then cooled to room temperature during a period of 2 hours, then run at 10,000 r.p.m. for another 22 hours. This cycle was repeated until the bearing failed.

In the foregoing table, Base Oil No. (1) was a California paraffinic base oil having a viscosity of 450 SSU at 100° F.; Base Oil No. (2) was a synthetic oil, Dow Corning DC-550, which is a poly(phenylmethyl siloxane); and Base Oil No. (3) was a California naphthenic base oil having a viscosity of 1700 SSU at 100° F.

It will, therefore, be apparent that novel compounds have been provided which are nonmetallic and which are capable of functioning as grease thickeners. Greases formed are characterized by high dropping points and, in many cases, by exceptionally high dropping points. The latter characteristic is highly advantageous in view of the fact that the thickeners are nonmetallic.

I claim:

1. The compound, N-tetradecyl-N'-phenylterephthaldiamide.

2. The compound, N-dodecyl-N'-phenylterephthaldiamide.

3. The compound, N-octadecyl-N'-phenylterephthaldiamide.

4. The compound
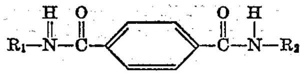
wherein $R_1$ is an alkyl and $R_2$ is a member selected from the group consisting of phenyl and tolyl.
References Cited in the file of this patent
UNITED STATES PATENTS
| | | |
|---|---|---|
| 2,123,375 | Mieg et al. | July 12, 1938 |
| 2,159,605 | Schumacher et al. | May 23, 1939 |
| 2,272,466 | Hummel | Feb. 10, 1942 |
OTHER REFERENCES
Rosenmund et al.: Deutsche Chemische Gesellschaft, vol. 54 (1921), p. 2892.
Dermer et al.: J. Org. Chem., vol. 8 (1942), pp. 168–173.
Grimmel et al.: J. Amer. Chem. Soc., vol. 68 (1946), pp. 539–540.

UNITED STATES PATENT OFFICE
CERTIFICATION OF CORRECTION

Patent No. 2,971,027 February 7, 1961

Bruce W. Hotten

It is hereby certified that error appears in the above numbered patent requiring correction and that the said Letters Patent should read as corrected below.

Column 5, line 63, for "brease" read -- grease --; column 6, line 3, for "amide for" read -- amide of --.

Signed and sealed this 22nd day of August 1961.

(SEAL)
Attest:

ERNEST W. SWIDER
Attesting Officer

DAVID L. LADD
Commissioner of Patents